United States Patent [19]
Adachi

[11] Patent Number: 5,739,793
[45] Date of Patent: Apr. 14, 1998

[54] MOBILE COMMUNICATION INFORMATION TERMINAL APPARATUS

[75] Inventor: Keigo Adachi, Tokyo, Japan

[73] Assignee: Mitsubishi Denki Kabushiki Kaisha, Tokyo, Japan

[21] Appl. No.: 715,494

[22] Filed: Sep. 18, 1996

[30] Foreign Application Priority Data

Jan. 9, 1996 [JP] Japan .................................. 8-001663

[51] Int. Cl.$^6$ ........................................................ H01Q 1/24
[52] U.S. Cl. .......................... 343/702; 343/895; 343/906
[58] Field of Search .................................. 343/702, 895, 343/900, 901, 906; 455/89, 90; H01Q 1/24

[56] References Cited

U.S. PATENT DOCUMENTS

| | | | |
|---|---|---|---|
| 5,214,437 | 5/1993 | Hensler | 343/72 |
| 5,343,213 | 8/1994 | Kottke et al. | 343/702 |
| 5,479,178 | 12/1995 | Ha | 343/702 |
| 5,594,457 | 1/1997 | Wingo | 343/702 |

FOREIGN PATENT DOCUMENTS

| | | | |
|---|---|---|---|
| 343847 | 11/1989 | European Pat. Off. | |
| 370715 | 5/1990 | European Pat. Off. | |
| 58-178603 | 10/1983 | Japan | 343/702 |
| 63-296401 | 12/1988 | Japan | H01Q 1/24 |
| 4-103204 | 4/1992 | Japan | H01Q 1/24 |
| 9410720 | 5/1994 | WIPO. | |

OTHER PUBLICATIONS

IBM Technical Disclosure Bulletin, vol. 38, No. 5, May 1995, New York, US, pp. 513–514 XP000519662, "Stylus Storage Within An Antenna."

*Primary Examiner*—Hoanganh T. Le
*Attorney, Agent, or Firm*—Rothwell, Figg, Ernst & Kurz

[57] ABSTRACT

A mobile communication information terminal apparatus comprises a mobile mainframe; a radio portion which is provided in the mainframe for transmitting and receiving via a radio channel; a control portion which is provided in the mainframe and connected to the radio portion for transmitting and receiving communication information; an operating portion which is provided in the mainframe for providing the communication information with the control portion by an operation from outside; a storage portion which is provided in the main frame for storing the communication information; an antenna attachment portion which is provided on a surface of the mainframe; a helical antenna which is provide in the antenna attachment portion and electrically connected to the radio portion; a combination antenna/touch pen comprising an electrical conductor portion having a predetermined length, which is attached into the antenna attachment portion along with a central axis of the helical antenna, wherein a tip of the combination antenna/touch pen is tapered like a pencil, the electrical conductor is electrically connected to the radio portion when the combination antenna/touch pen is attached into the antenna attachment portion, and an operation can be possible to the operating portion from outside; and a switching means for switching from the helical antenna to the combination antenna/touch pen when the combination antenna/touch pen is attached to the antenna attachment portion; wherein according to the operation of the switching means, the control portion reads out the communication information from the storage portion and carries out communication via the combination antenna/ touch pen.

16 Claims, 10 Drawing Sheets

MOBILE COMMUNICATION INFORMATION TERMINAL APPARATUS

BACKGROUND OF THE INVENTION

1. Field of the Invention

The invention relates to a mobile communication information terminal apparatus which has a function of a mobile-type information processing apparatus, and which is connected to an information processing center via a radio channel for transmitting and receiving information to and from the information processing center or with other terminal apparatus.

2. Description of the Prior Art

In the past, an information processing apparatus generally used as single apparatus at a fixed position, or it is connected to a remotely located information processing center via wire transmission path for providing information processing services.

However, along with a tendency that information and communication are getting personalized, mobilized, and systematized in recent years, the information processing apparatus is made smaller for the convenience of carriage, and assembled as a mobile communication information terminal apparatus in which a radio communication function is attached.

Accordingly, the mobile communication information terminal apparatus is needed to be small-sized for the convenience of carriage, therefore input/output portions for control information and communication information are also needed to be realized in a small space. For this reason, a common portion is shared for both the display output and information input purposes. In other words, it becomes common to use a construction which enables a user to input information by pressing a display surface with a tip of information input apparatus. The information input apparatus, which is separately provided from the mainframe of the mobile communication information terminal apparatus, is usually carded separately from the mainframe, or put in a storage space for the information input apparatus, which is arranged on the mainframe.

Moreover, the mobile communication information terminal apparatus has an antenna which is small enough for the convenience of carriage.

Since a conventional mobile information terminal apparatus is constructed in this way, the information input apparatus which is constructed separately from the mainframe is often lost when a user carries it separately from the mainframe. If a storage space for the information input apparatus is provided with the mainframe, it enlarges the size of the mainframe and become inconvenient for carriage.

Moreover, if an antenna is made smaller, it often deteriorates the transmission efficiency and reception sensitivity.

It is an object of the invention to minimize the size of the mainframe when the information input apparatus is attached to the mainframe of the mobile communication information terminal apparatus so as not to lose the information input apparatus, and to improve the overall performance of the antenna when the information input apparatus is attached to the mainframe and used as an antenna.

SUMMARY OF THE INVENTION

According to one aspect of the invention, a mobile communication information terminal apparatus comprises a mobile mainframe; a radio portion which is provided in the mainframe for transmitting and receiving radio-wave to and from a radio channel; a control portion which is provided in the mainframe and connected to the radio portion for transmitting and receiving communication information; an operating portion which is provided on the front surface of the mainframe for providing the communication information with the control portion by an operation from outside; an antenna attachment portion which is provided on a surface of the mainframe; and a combination antenna/touch pen antenna with touch pen (or) which serves as an antenna and also makes it possible to access to the operating portion from outside.

Preferably, the antenna with touch pen comprises an electrical conductor portion having a predetermined length, and a tip of the antenna with touch pen is tapered like a pencil, wherein the electrical conductor is electrically connected to the radio portion when the antenna with touch pen is attached to the antenna attachment portion, and an operation can be possible to the operating portion from outside. The antenna with touch pen comprises a slim bar-shape electrical conductor portion along with the center axis of the antenna with touch pen whose outer surface is surrounded by insulating material, and the bottom of the electrical conductor portion has a screw portion with larger diameter than the slim bar-shape electrical conductor portion, and a tip of screw portion is tapered like a pencil. The length of the electrical conductor is set to around a quarter of the wave length. The antenna attachment portion comprises an antenna connection portion with a female screw and the antenna connection portion contacts an antenna feeding portion.

According to another aspect of the invention, a mobile communication information terminal apparatus further comprises an antenna matching portion which is provided in the mainframe.

According to another aspect of the invention, a mobile communication information terminal apparatus further comprises an attachment case which is provided in the mainframe for inserting the antenna with touch pen inside the mainframe.

According to another aspect of the invention, a mobile communication information terminal apparatus further comprises a helical antenna which is provided in the antenna attachment portion and around to the bar-type antenna, and electrically connected to the radio portion; a switching means for switching from the helical antenna to the antenna with touch pen when the antenna with touch pen is attached to the antenna attachment portion.

According to further aspect of the invention, a mobile communication information terminal apparatus further comprises a helical antenna which is provided in the antenna attachment portion and around to the bar-type antenna, and one end of the helical antenna electrically contacts the one end of the antenna attachment portion.

According to further aspect of the invention, a mobile communication information terminal apparatus further comprises a storage portion which is provided in the main flame for storing the communication information; and wherein, according to an operation of the switching means, the control portion reads out the communication information from the storage portion and carries out communication via the antenna with touch pen.

According to further aspect of the invention, a mobile communication information terminal apparatus further comprises a second switching means for detecting the insertion of the antenna with touch pen into the antenna connection portion; a storage portion which is provided in the main flame for storing the communication information; and wherein, according to an operation of the second switching means, the control portion reads out the communication information from the storage portion and carries out communication via the antenna with touch pen.

According to further aspect of the invention, a mobile communication information terminal apparatus further comprises a helical antenna which is provided in the antenna attachment portion and around to the bar-type antenna, and electrically connected to the radio portion.

DETAILED DESCRIPTION OF THE PREFERRED EMBODIMENTS

Embodiment 1

Figure 1A:
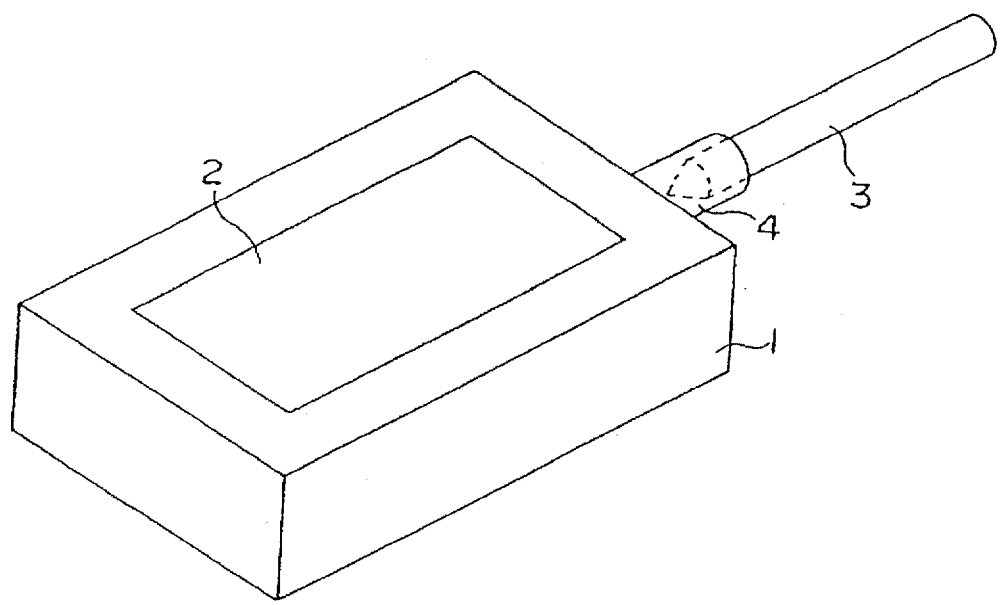
FIG. 1A, FIG. 1B are diagrams of externals for explaining a mobile communication information terminal apparatus according to a first embodiment of the invention briefly.
Figure 1B:
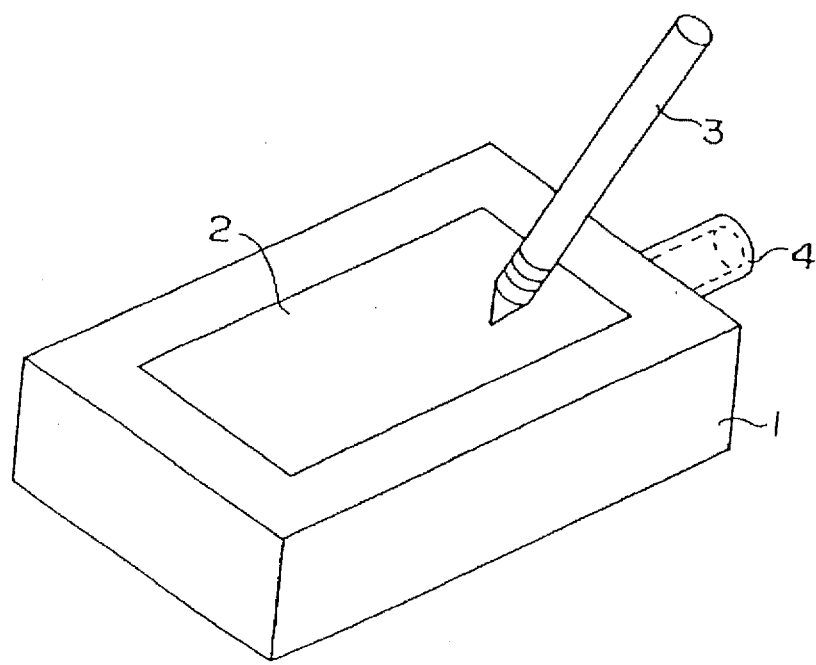

A first embodiment of the invention is explained below with reference to figures. FIG. 1A, FIG. 1B are diagrams showing a whole view of a mobile communication information terminal apparatus mainframe 1. In FIG. 1A, FIG. 1B, information is inputted to an input/output portion, namely, a display/input operating portion 2, by pressing a pencil-like tapered tip of the antenna with touch pen 3. The antenna with touch pen 3 has also a function as a transmission and reception antenna other than the function of inputting information. By attaching the antenna with touch pen 3 to an antenna attachment portion 4 so that the antenna with touch pen 3 is easily attached to and removed from the mobile communication information terminal apparatus 1, the antenna with touch pen 3 can operate as an antenna of the mobile communication information terminal apparatus 1.

FIG. 1A shows an antenna with touch pen 3 which is attached into the antenna attachment portion 4 of the mobile communication information terminal apparatus mainframe 1. In this state, the antenna with touch pen 3 is carried with the mobile communication information terminal apparatus. The transmission and reception of information between the mobile communication information terminal apparatus and an information center, or among a plurality of other mobile communication information terminal apparatuses are carded out in this state via radio channel.

FIG. 1B shows how the control information or communication information is inputted to the mobile communication information terminal apparatus. The control information or communication information is inputted to the mobile communication information terminal apparatus by removing the antenna with touch pen 3 from the mobile communication information terminal apparatus 1 and pressing the tip of the antenna with touch pen 3 on the surface of the display/input operating portion 2.

The mobile communication information terminal apparatus is generally classified into the following types.

(1) A first type of mobile communication information terminal apparatus which does not allow a user to transmit nor to receive information via radio channel while information is inputted.

(2) A second type of mobile communication information terminal apparatus which enable a user either to transmit or to receive information via radio channel while information is inputted.

The first and second embodiments relate to a first type of the mobile communication information terminal apparatus, and the third, fourth, fifth and sixth embodiments relate to a second type of the mobile communication information terminal apparatus.

Figure 2:
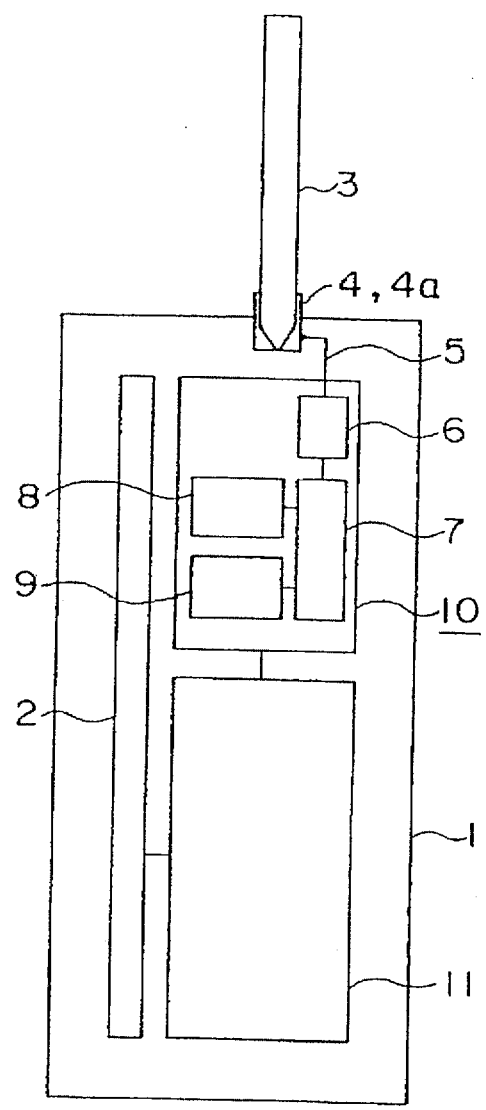
FIG. 2 is a block diagram showing a functional construction of a mobile communication information terminal apparatus according to a first embodiment of the invention.

Referring to figures, the first embodiment is explained in detail as follows. FIG. 2 is a diagram showing a functional construction of a mobile communication information terminal apparatus comprising a mobile communication information terminal apparatus mainframe 1, a display/input operating portion 2, an antenna with touch pen 3, an antenna attachment portion 4, an antenna feeding portion 5 for feeding electric power to the antenna via the antenna attachment portion, an impedance matching portion 6 for matching impedance of the antenna, an antenna sharing device 7 for using the antenna for both transmission and reception, a reception portion 8 for receiving information via radio channel, a transmission portion 9 for transmitting information via radio channel, and a radio portion 10 which consist of the antenna matching portion 6, the antenna sharing device 7, the reception portion 8, and the transmission portion 9. A control portion 11 transmits and receives the information with the radio portion 10 and the display/input operating portion 2, while it stores and processes communication information, and also controls the operation of the mobile communication information terminal apparatus itself.

As mentioned later, the antenna with touch pen 3 is constructed such that it operates as an antenna of a mobile communication information terminal apparatus when it is attached into the antenna attachment portion 4.

Referring to FIG. 2, the operation is explained below. In case of information transmission, a user removes the antenna with much pen 3 from the antenna attachment portion 4, and presses the tip of the antenna with touch pen 3 on the surface of the display/input operating portion 2 for inputting control information or communication information. When information input is completed, the user attaches again the antenna with touch pen 3 to the antenna attachment portion 4. The inputted communication information is stored and processed in the control portion 11 and then transmitted to the radio portion 10. The transmitted communication information is further transmitted from the transmission portion 9, via the antenna sharing device 7, antenna matching portion 6 in the radio portion 10, the antenna feeding portion 5 and the antenna attachment portion 4, and finally transmitted from the antenna with touch pen 3.

In case of reception of information, the receiving operation is carried out in the reverse order. That is, the information electric wave transmitted via the radio channel is received on the antenna with touch pen 3 which is received into the antenna attachment portion 4, and transmitted to the reception portion 8, via the antenna feeding portion 5, the antenna matching portion 6, the antenna sharing device 7 in the radio portion 10, and then taken out from the reception portion 8 as information. The received information is stored and processed in the control portion 11, and converted into a display format such as characters and pictures to be outputted on the display/input operating portion 2.

In this way, the mobile communication information terminal apparatus enables a user to transmit and receive information via radio channel by using the antenna with touch pen 3 as an antenna.

In this embodiment, it is assumed that a radio system is capable of interactive simultaneous communication by frequency division, which requires the antenna sharing device 7. However, this mobile communication information terminal apparatus can be applied to other radio systems as well.

Figure 3A:
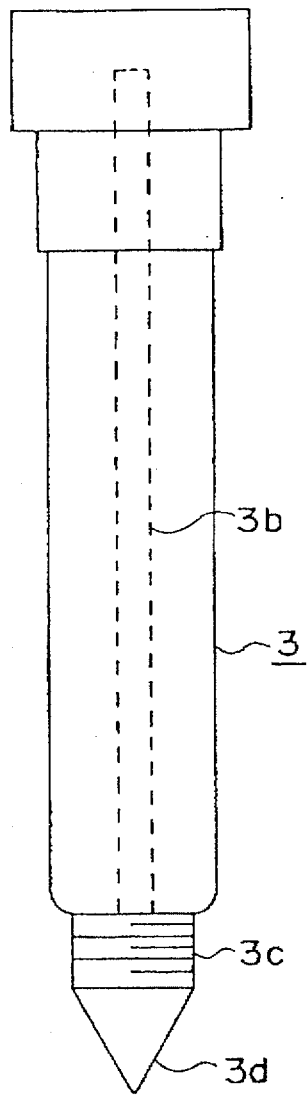
FIG. 3A, FIG. 3B are external/cross sectional construction diagrams showing a construction of an antenna with touch pen of a mobile communication information terminal apparatus according to a first embodiment of the invention.
Figure 3B:
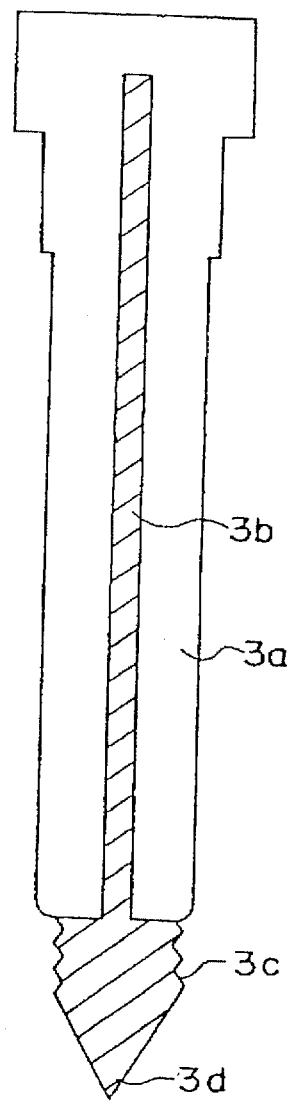

Referring to FIG. 3A, FIG. 3B, the construction of the antenna with touch pen is explained below. FIG. 3A is a diagram showing a whole view of the antenna with touch pen, and FIG. 3B is a diagram showing a cross sectional view of the antenna with touch pen.

In FIG. 3A, FIG. 3B, a grip 3a is made of insulating material such as ABS resin. The grip 3a is made so that the antenna with touch pen 3 fits well to the hand of the user when information is inputted on the display/input operating portion of the mobile communication information terminal apparatus. An axis portion 3b consists of electrical conductor, which ensures a necessary electrical length corresponding to the wave length of transmission and reception wave, for obtaining a predetermined antenna characteristics, when the antenna with touch pen 3 is attached into the antenna attachment portion 4 to operate as an antenna. In FIG. 3A, FIG. 3B, the axis portion 3b fits with a slim long hole provided in the grip 3a. The electrical length is generally a half or a quoter of the wave length of the wave which is used in the radio communication. A connection portion 3c consists of electrical conductor which is electrically connected to the axis portion 3b. The connection portion 3c enables a user to attach/remove the antenna with touch pen 3 to/from the antenna attachment portion easily. In FIG. 3A, FIG. 3B, the connection portion 3c has a screw construction so that it fits to the screw reception portion formed in the antenna attachment portion 4. A tip portion 3d is tapered suitably for enabling a user to input the information accurately to the display/input operating portion 2, when the information is inputted to the mobile communication information terminal apparatus. The tip portion 3d can be made of insulating material because it does not form an effective electrical length when the antenna with touch pen 3 operates as an antenna. The grip 3a is not necessarily made of insulating material, either.

Since the antenna with touch pen 3 is constructed as mentioned above, it is used both as an information input apparatus when it is removed from the mainframe 1, and as an antenna of a mobile communication information terminal apparatus when it is attached into the antenna attachment portion 4 of the mainframe 1.

It is possible to construct the connection portion 3c differently other than the screw construction, as long as it fits to the connection portion of the antenna attachment portion 4.

Figure 4A:
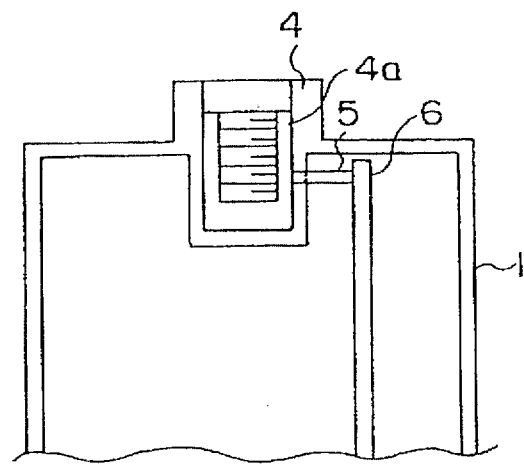
FIG. 4A, FIG. 4B are cross sectional construction diagrams showing details of an antenna attachment portion of a mobile communication information terminal apparatus according to a first embodiment of the invention.
Figure 4B:
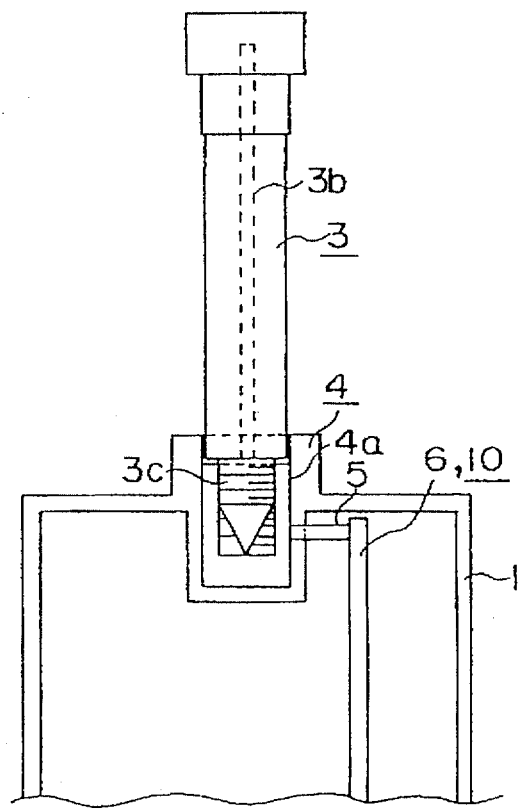

Referring to FIG. 4A, FIG. 4B, a detailed construction of the antenna attachment portion 4 is explained below. FIG. 4A shows a state before the antenna with touch pen 3 is attached. FIG. 4B shows a state after the antenna with touch pen 3 is attached. In FIG. 4A, FIG. 4B, the antenna attachment portion 4 is formed on the upper surface portion of the mobile communication information terminal mainframe 1. The antenna attachment portion 4 itself consists of insulating material as same as the mainframe 1. In the central portion of the antenna attachment portion 4, an antenna connection portion 4a which is exposed outside the mobile communication information terminal apparatus mainframe 1 is formed.

On the inside surface of the antenna connection portion 4a, fitting mechanism, that is, a female screw is provided which corresponds to the connection portion 3c. The antenna connection portion 4a is made of electrical conductor, and connected to the antenna feeding portion 5. The antenna feeding portion 5 is connected to the antenna matching portion 6 in the radio portion 10 which is included in the mobile communication information terminal mainframe 1.

Since the antenna attachment portion is constructed as mentioned above, it makes the antenna with touch pen 3 operate as an antenna of a mobile communication information terminal apparatus as explained below. As shown in FIG. 4B, when the antenna with touch pen 3 is attached to the mainframe 1 via its connection portion 3c which fits to the antenna connection portion 4a, the conductive axis portion 3b of the antenna with touch pen 3 stands on outside the upper surface of the mobile communication information terminal mainframe 1. In other words, the antenna axis portion 3b, which has an electrical length to operate as an antenna, is electrically connected to the radio portion 10 via the connection portion 3c, the antenna connecting portion 4a, and the antenna feeding portion 5, and functions as an antenna.

The connection mechanism consisting of the connection portion 3c and the antenna connecting portion 4a facilitates the attachment and removal of the antenna with touch pen 3 with the mobile communication information terminal apparatus. Therefore, when information is inputted, the antenna with touch pen is removed and can be used as a touch pen, namely, as an information inputting apparatus. In other words, the antenna with touch pen 3 of the present embodiment has two functions as a conventional touch pen and as an antenna apparatus. Since the antenna with touch pen 3 which is constructed as mentioned above is attached to the mainframe 1 unless it is used for inputting information, it is not lost while a user carries the mainframe.

Furthermore, since the antenna with touch pen 3 is attached as an indispensable element of the mobile communication information terminal apparatus mainframe 1, it does not contribute to an unnecessary increase in the size of a mainframe.

Embodiment 2

Figure 5C:
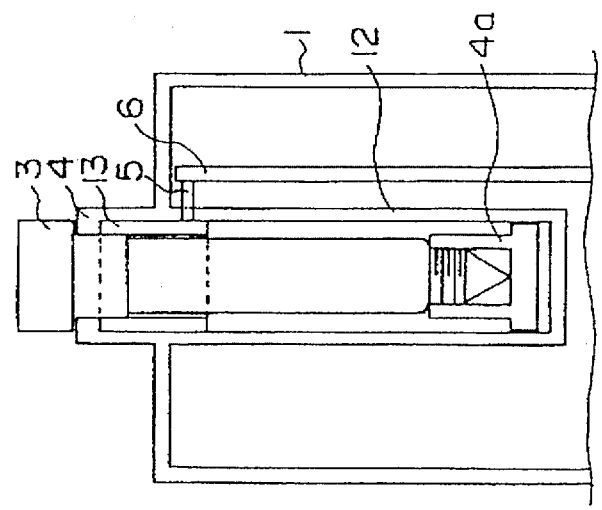
FIG. 5A, FIG. 5B, FIG. 5C are cross sectional construction diagrams showing details of an antenna attachment portion of a mobile communication information terminal apparatus according to a second embodiment of the invention.
Figure 5B:
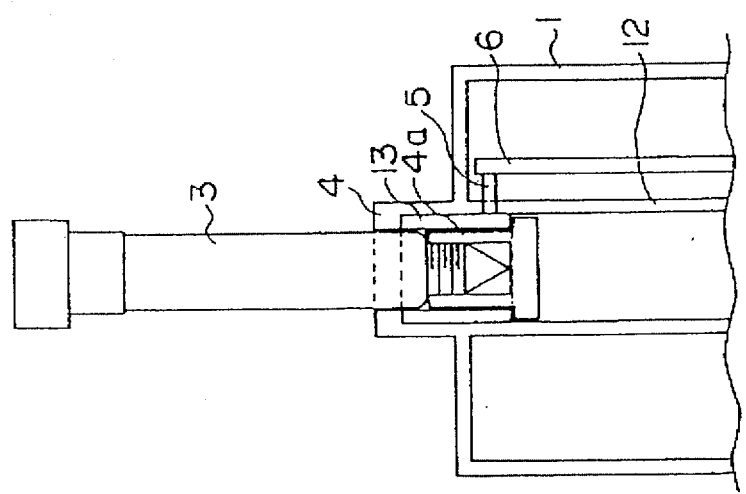
Figure 5A:
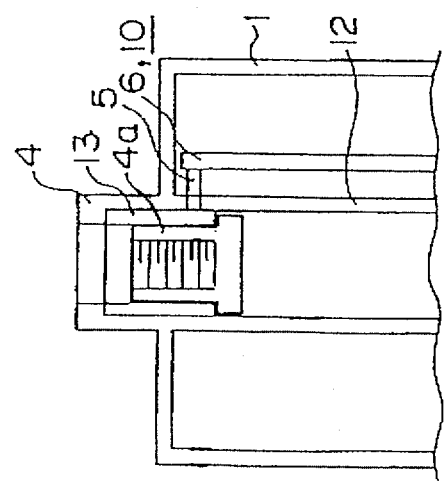

A second embodiment of the invention is explained below with reference to figures. FIG. 5A, FIG. 5B, FIG. 5C are diagrams showing a partial cross sectional view of a construction of a mobile communication information terminal apparatus according to a second embodiment. FIG. 5A shows a mainframe before the antenna with touch pen 3 is attached. FIG. 5B shows the mainframe when the antenna with touch pen 3 is attached into the antenna attachment portion of the mainframe. FIG. 5C shows the mainframe when the antenna with touch pen 3 is inserted inside the mainframe.

In FIG. 5A, FIG. 5B, FIG. 5C, an attachment case 12 accommodates the antenna with touch pen 3 thereinside, and a ring 13 made of electrical conductor is provided inside the attachment case 12 for supporting the antenna with touch pen 3 which extends outside from the mainframe 1 by a predetermined length when the antenna with touch pen 3 operates as an antenna. An antenna feeding portion 5 is made of a spring-like metal plate, and electrically connected to the ring 13 by mechanically being pushed to the ring 13. As shown in FIG. 5B, the antenna with touch pen 3 attached in an antenna connection portion 4a of an antenna attachment portion 4 is electrically connected to a radio portion 10 via the antenna connection portion 4a, the ring 13 and the antenna feeding portion 5, when it operates as an antenna.

The antenna connection portion 4a slides the inside surface of the attachment case 12 and stops by friction at the end of the ring 13 provided inside the attachment case 12, which causes the antenna with touch pen 3 to extend outside the mainframe by a predetermined length so that the antenna with touch pen 3 can operate as an antenna.

As shown in FIG. 5C, when the antenna with touch pen 3 is inserted inside the mainframe 1, the antenna connection portion 4a to which the antenna with touch pen 3 is attached comes to a bottom of the attachment case 12. Since an inside surface of the bottom portion of the attachment case 12 is insulated, the antenna with touch pen 3 is electrically disconnected from the radio portion 10.

On the other hand, since only the rear portion of the antenna with touch pen 3 bulges out from the mainframe 1, the user can pull it out easily when it is used as a touch pen or as an antenna in the next time.

According to this embodiment, the portion bulging out from the mainframe 1 is minimized as mentioned above so that the mainframe is made more convenient for carriage.

Embodiment 3

Figure 6:
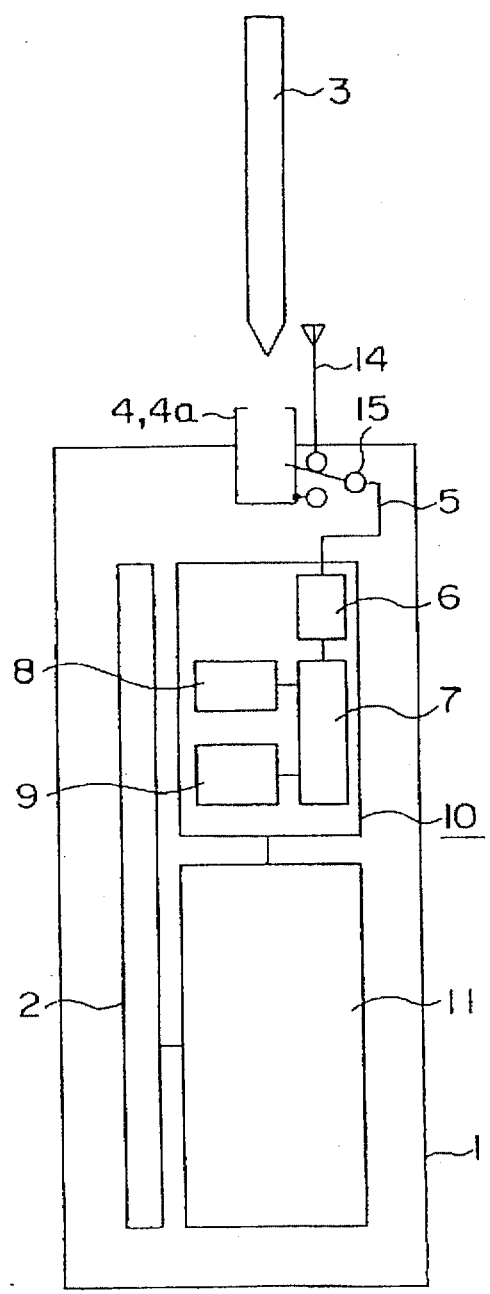
FIG. 6 is a block diagram showing a functional construction of a mobile communication information terminal apparatus according to a third embodiment of the invention.

A third embodiment of the invention is explained below with reference to figures. FIG. 6 is a block diagram showing a mobile communication information terminal apparatus according to the third embodiment. Only the portions in FIG. 6 which is different from those in the first and second embodiments are explained below. An antenna switch 15 is connected to an impedance matching portion 6. The antenna switch 15 transfers contact between two different antennae. The antenna switch 15 switches a first antenna and a second antenna, namely, an antenna with touch pen 3 and a helical antenna, and connects either one of the two antennas to the antenna matching portion 6 via an antenna feeding portion 5.

Figure 7A:
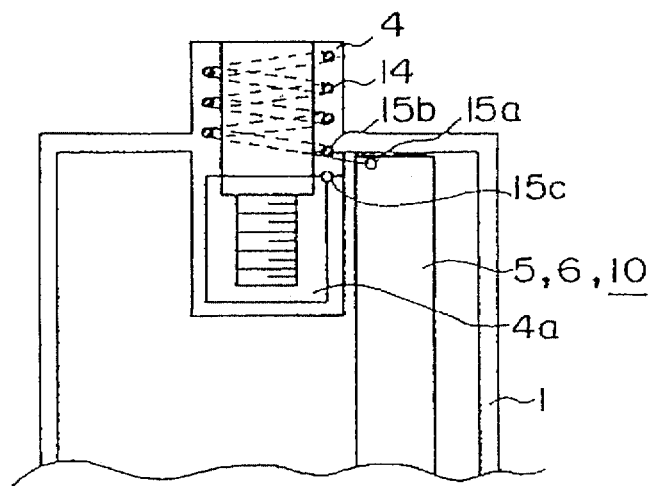
FIG. 7A, FIG. 7B are cross sectional construction diagrams showing details of an antenna attachment portion of a mobile communication information terminal apparatus according to a third embodiment of the invention.
Figure 7B:
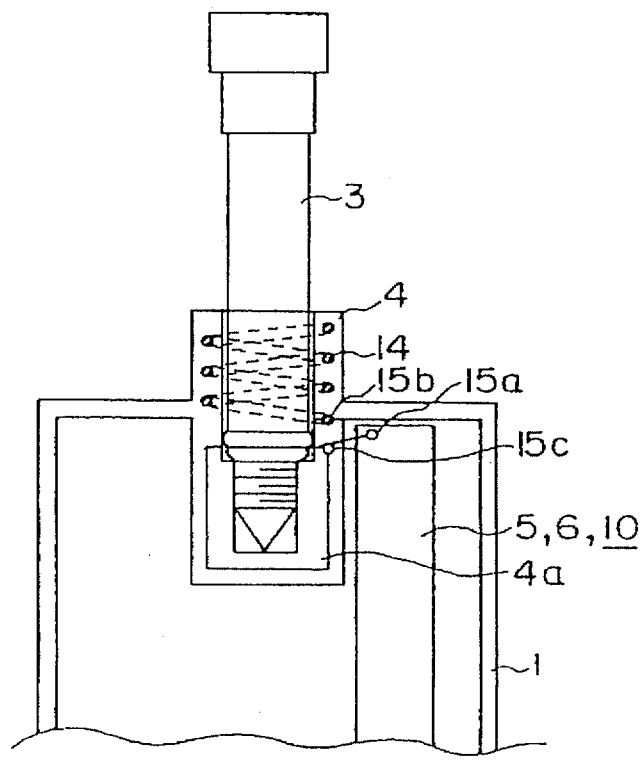

Referring to FIG. 7A, FIG. 7B, a detailed construction of the antenna attachment portion 4 is explained below. FIG. 7A shows a state before the antenna with touch pen 3 is attached. FIG. 7B shows a state after the antenna with touch pen 3 is attached. In FIG. 7A, FIG. 7B, the antenna attachment portion 4 is formed on the upper surface portion of the mobile communication information terminal mainframe 1.

In the upper portion of the antenna attachment portion 4, the helical antenna 14 is formed so that it bulges out from the mobile communication information terminal apparatus mainframe 1. The helical antenna 14 is a coil-shaped electrical conductor which is made of a piano wire and so on. The whole length of the electrical conductor is set to around a quarter of the wave length to shorten the bulging portion. The antenna switch 15 is provided with the antenna matching portion 6, and comprises a movable contact 15a which is connected to the antenna matching portion 6, a first fixed contact 15b which is connected to a second antenna, namely the helical antenna, 14, and a second fixed contact 15c which is connected to the antenna connection portion 4a.

An operation of the antenna switch 15 is explained below. When the antenna with touch pen 3 is not attached in the antenna attachment portion 4, the movable contact 15a contacts the first fixed contact 15b, as shown in FIG. 7A, so that the second antenna, namely, the helical antenna 14 is connected to the antenna matching portion 6 via the antenna feeding portion 5, and electrical power is fed to the helical antenna 14.

When the antenna with touch pen 3 is attached in the antenna attachment portion 4, the movable contact 15a of the antenna switch 15 is pushed downward by the protruded portion provided with the antenna with touch pen 3, as shown in FIG. 7B, so that the movable contact 15a contacts the second fixed contact 15c. As a result, the antenna with touch pen 3, namely, the first antenna, is connected to the antenna feeding portion 5 and the antenna matching portion 6 via the antenna connection portion 4, and electrical power is fed to the first antenna.

The antenna with touch pen 3 and the helical antenna 14 are adjusted to have the same impedance so that they can be used at the same antenna matching portion 6. If the impedance of the antenna with touch pen 3 is different from that of the helical antenna 14, each antenna is connected to respective antenna matching portions 6, and respective the antenna matching portions 6 are switched at the portion where the antenna matching portions 6 are coupled to the antenna sharing device 7.

If the electric conductor of the antenna with touch pen 3 may have any difficulties by contacting the movable contact 15a, the contacting surface of either the antenna with touch pen 3 or the movable contact 15a can be insulated, which gives a desired switching characteristic. According to this embodiment, since the movable contact 15a of the antenna switch 15 is formed on the substrate of the antenna matching portion circuit 6, the antenna feeding portion 5 can be formed on that substrate.

In the helical antenna, the electric fields is generally canceled due to the feeding current distribution caused by an antenna element. On the other hand, in the bar-shaped antenna, there is no such cancellation, the antenna gain of the bar-shaped antenna is generally higher than a helical antenna. Accordingly, by attaching the antenna with touch pen 3 to the antenna connection portion 4, a mobile communication information terminal apparatus, whose antenna performance is superior to that of a helical antenna, is obtained. Furthermore, by connecting the helical antenna 14 to the radio portion 10, the mobile communication information terminal apparatus can transmit and receive information via radio channel even during the input operation, although it may depend on the intensity degree of the electric fields.

Embodiment 4

Figure 8C:
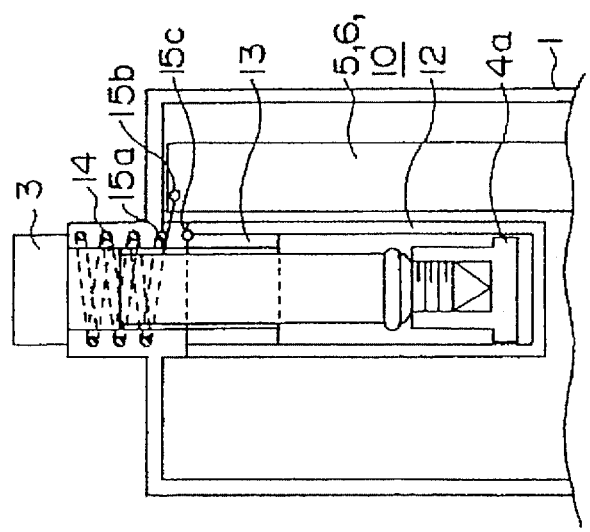
FIG. 8A, FIG. 8B, FIG. 8C are cross sectional construction diagrams showing details of an antenna attachment portion of a mobile communication information terminal apparatus according to a fourth embodiment of the invention.
Figure 8B:
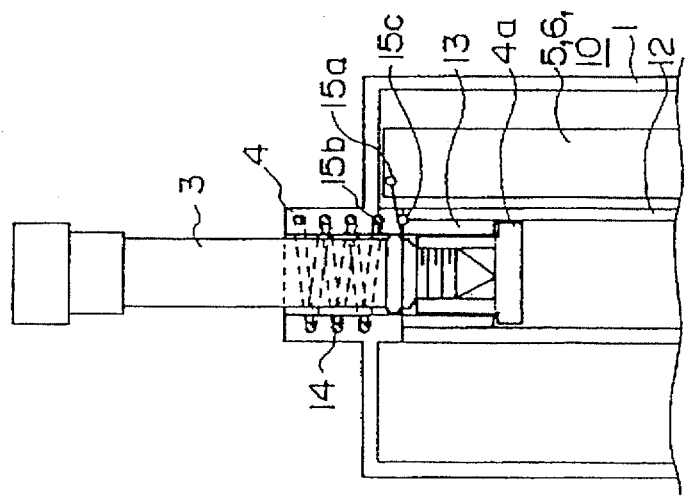
Figure 8A:
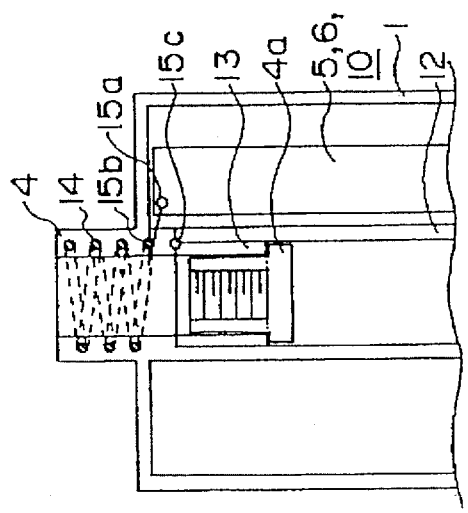

A fourth embodiment of the invention is explained below with reference to figures. FIG. 8A, FIG. 8B, FIG. 8C are diagrams showing a partial cross sectional view of a construction of a mobile communication information terminal apparatus according to the fourth embodiment. FIG. 8A shows a mainframe before an antenna with touch pen 3 is attached. FIG. 8B shows the mainframe when the antenna with touch pen 3 is attached into the antenna attachment portion of the mainframe. FIG. 8C shows the mainframe when the antenna with touch pen 3 is inserted inside the mainframe.

An operation of an antenna of the fourth embodiment is explained below. When the antenna with touch pen 3 is not attached in an antenna attachment portion 4, an movable contact 15a contacts a first fixed contact 15b, as shown in FIG. 8A, so that the second antenna, namely, a helical antenna 14 is connected to an antenna matching portion 6 via an antenna feeding portion 5, and electrical power is fed to the helical antenna 14.

When the antenna with touch pen 3 is attached in the antenna attachment portion 4, the movable contact 15a of an antenna switch 15 is pushed downward by a protruded portion provided with the antenna with touch pen 3, as shown in FIG. 8B, so that the movable contact 15a contacts a second fixed contact 15c. As a result, the antenna with touch pen 3, namely, the first antenna, is connected to the antenna feeding portion 5 and the antenna matching portion 6 via the antenna connection portion 4, and electrical power is fed to the first antenna.

When the antenna with touch pen 3 is attached inside the mainframe 1, the protruded portion provided with the antenna with touch pen 3 goes to downward in the attachment case 12 as shown in FIG. 8C, so that the movable contact 15a contacts the first fixed contact b again. As a result, a second antenna, namely, the helical antenna 14 is connected to the antenna matching portion 6, then the electrical power is fed to the helical antenna 14. Accordingly, the antenna with touch pen 3 does not operate at this state.

If the electric conductor of the antenna with touch pen 3 may have any difficulties by contacting the movable contact 15a, the contacting surface of either the antenna with touch pen 3 or the movable contact 15a can be insulated, which gives a desired switching characteristic. According to this embodiment, since the movable contact 15a of the antenna switch 15 is formed on the substrate of the antenna matching portion circuit 6, the antenna feeding portion 5 can be formed on that substrate.

Since the antenna gain of the bar-shaped antenna is generally higher than a helical antenna. Accordingly, by attaching the antenna with touch pen 3 to the antenna connection portion 4, a mobile communication information terminal apparatus, whose antenna performance is superior to that of a helical antenna, is obtained. Furthermore, by connecting the helical antenna 14 to the radio portion 10, the mobile communication information terminal apparatus can transmit and receive information via radio channel even during the input operation. Furthermore, the portion bulging out from the mainframe 1 is minimized as mentioned above so that the mainframe is made more convenient for carriage.

Embodiment 5

Figure 9C:
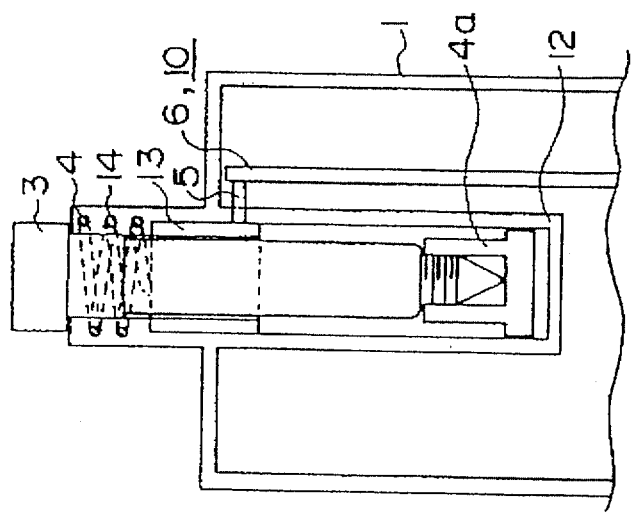
FIG. 9A, FIG. 9B, FIG. 9C are cross sectional construction diagrams showing details of an antenna attachment portion of a mobile communication information terminal apparatus according to a fifth embodiment of the invention.
Figure 9B:
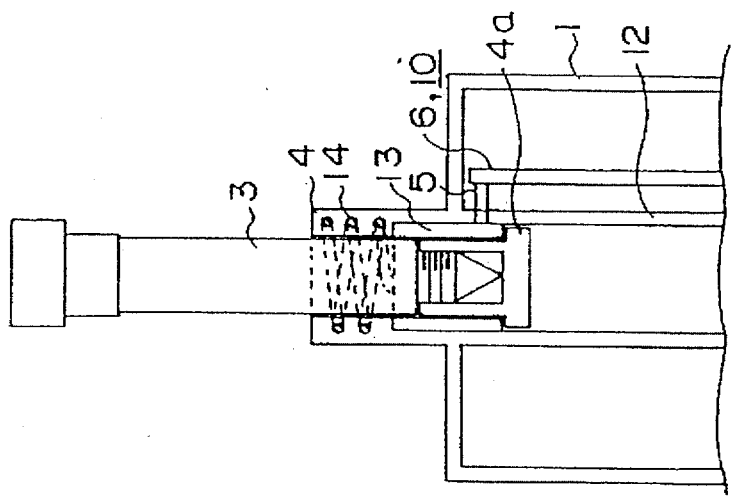
Figure 9A:
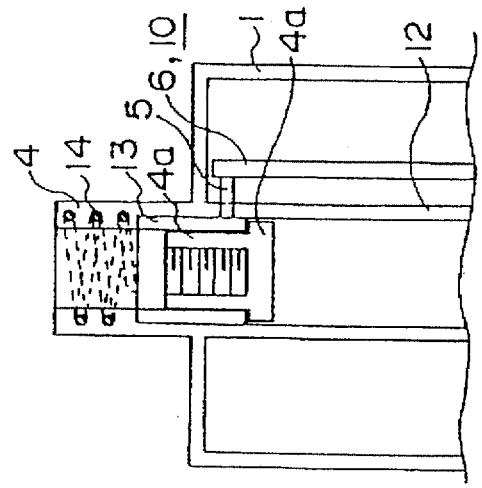

A fifth embodiment of the invention is explained below with reference to figures. FIG. 9A shows a mainframe before an antenna with touch pen 3 is attached. FIG. 9B shows the mainframe when the antenna with touch pen 3 is attached into the antenna attachment portion of the mainframe. FIG. 9C shows the mainframe when the antenna with touch pen 3 is inserted inside the mainframe.

One edge of a helical antenna 14 is connected to an antenna connection portion 4a which consists of electrical conductor. When the antenna with touch pen 3 is not attached to an antenna connection portion 4, an antenna feeding portion 5 feeds the electric power only to a helical antenna 14 via the antenna connection portion 4. When the antenna with touch pen 3 is attached to an antenna connection portion 4, an antenna feeding portion 5 feeds the electric power to both the antenna with touch pen and the helical antenna 14 via the antenna connection portion 4.

The impedance of the antenna depends on the shape of electrical conductor which forms the antenna, electrical length and the shape of the mainframe to which an antenna is attached.

If the shape and electrical length of the antenna with touch pen 3 and the helical antenna 14 are decided such that the impedance of the helical antenna 14 is the same as that of the parallel circuit of the antenna with touch pen 3 and the helical antenna when the antenna with touch pen 3 is attached into the antenna attachment portion 4, the same antenna matching portion 6 can be used for both the antennas, and therefore, the antenna switch 15 as shown in the third embodiment can be eliminated, which reduces the manufacturing cost. The shape and the electrical length of each antenna can be decided by carrying out a simulation such as a finite element method, a trial manufacturing, or an experiment.

Embodiment 6

Figure 10:
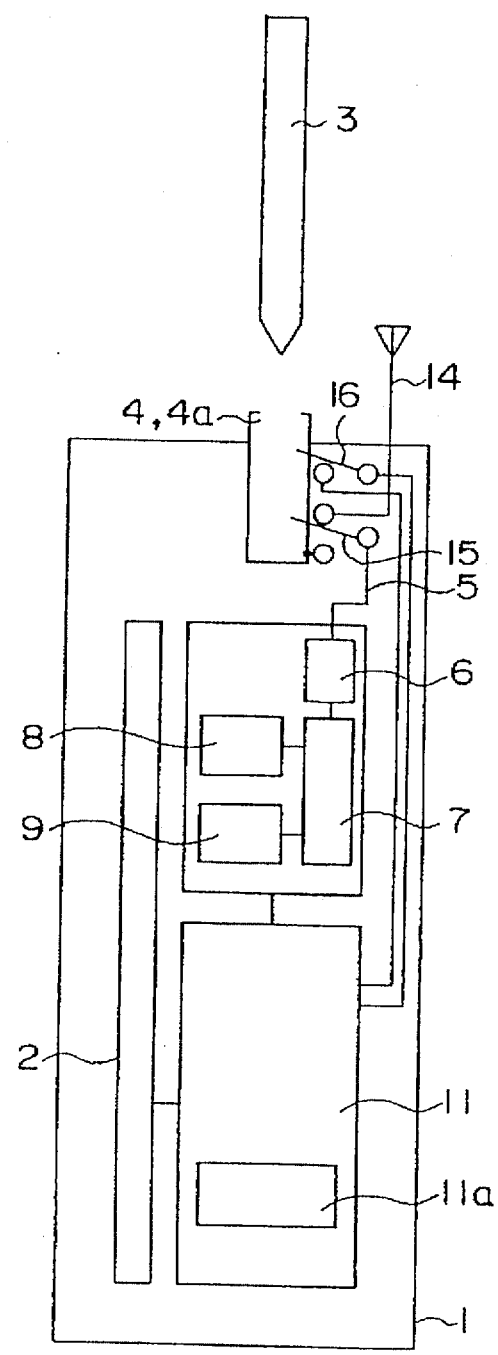
FIG. 10 is a block diagram showing a functional construction of a mobile communication information terminal apparatus according to a sixth embodiment of the invention.

FIG. 10 is a block diagram showing a mobile communication information terminal apparatus according to a sixth embodiment. Only the portions in FIG. 10 which is different from the above-mentioned embodiments are explained below. The sixth embodiment comprises a storage portion 11a which comprises a control portion 11 and an antenna switch 15 and an antenna detecting switch 16 which comprises an antenna matching portion 6. The antenna switch 15 constructs a transfer contact. The antenna switch 15 switches a tint antenna and a second antenna, namely, an antenna with touch pen 3 and a helical antenna, and connects either one of the two antennas to the antenna matching portion 6 via an antenna feeding portion 5. An antenna detecting switch 16 constructs a make contact. The information on open/close of the make contact is transmitted to the control portion 11.

An operation of an antenna of the sixth embodiment is explained below. When the antenna with touch pen 3 is not attached to an antenna connection portion 4, a second antenna, namely a helical antenna 14, is connected to the antenna matching portion 6 via an antenna feeding portion 5. In this state, for example, only reception of information, is possible, although it may depend on the intensity degree of the electric fields. In a strong electric field region close to a communication station, namely, an information processing center, it is of course possible both to transmit and receive the information. On the other hand, the antenna detecting switch 16 transmits the information in which the contact is open to the control portion 11. Even if this information is received, the control portion 11 does not operates except receiving the input from a display/input operating portion 2.

Alternatively, after communication information is inputted to the display/input operating portion 2 using the antenna with touch pen 3, assuming that the antenna with touch pen 3 is attached into the antenna attachment portion 4 in order to transmitting the communication information via radio channel to the information processing center or other mobile communication information terminal apparatus. Then, the second antenna, namely, the helical antenna 14 is disconnected by means of the antenna switch 15, and the antenna with touch pen 3 is connected to the radio portion 10 which comprises the antenna feeding portion 5 and the antenna matching portion 6 and so on. An information of the antenna detecting switch 16 which is in a close state is sent to the control portion 11. The control portion 11 requests the radio portion 10 to transmit the communication information, which is read out beforehand from the storage portion 11a by means of the display/input operating portion 2, to the radio channel via the antenna with touch pen 3.

In this embodiment, a make contact is used in the antenna detecting switch 16, but it is possible to use a brake contact, which operate in the same manner. Furthermore, any arbitrary contact numbers or contact construction are applicable to the antenna switch 15 and the antenna detecting switch 16 by use of the similar mechanism.

If the electric conductor of the antenna with touch pen 3 may have any difficulties by contacting the movable contact 15a, the contacting surface of either the antenna with touch pen 3 or the movable contact 15a can be insulated, which gives a desired switching characteristic.

According to this sixth embodiment, since the switching mechanism between two antennas can be formed simply, the antenna matching which makes the antenna performance appropriate can be easier. Moreover, operation is simplified because transmission of communication information can be easily carried out by simply attaching an antenna with touch pen to an antenna attachment portion of the mainframe. Furthermore, the information that the antenna with touch pen is attached into the antenna attachment portion can be used as transmission trigger information as well as reception trigger information and other communication control information.

In the second, third, fourth, and fifth embodiments, a helical antenna is used as a second antenna. But, it is possible to use a small antenna such as an inverted F type antenna, or a patch antenna by means of micro stripe for a second antenna. It is also possible to arrange these small antennas at a location other than the antenna attachment portion 4.

What is claimed is:

1. A mobile communication information terminal apparatus, comprising:

a mobile mainframe;

a radio portion which is provided in said mainframe for transmitting and receiving radio-wave signals over a radio channel;

a control portion which is provided in said mainframe and is connected to said radio portion for transmitting to said radio portion communication control information;

a touch-sensitive display/input operating portion which is provided on a surface of said mainframe for providing input function information to said control portion in response to touch operation by a user;

an antenna attachment portion which is provided on a surface of said mainframe for coupling said radio-wave signals between said radio portion and an antenna; and a combination antenna/touch pen which is removably attached to said antenna attachment portion, said combination antenna/touch pen serving as an antenna when attached to said antenna attachment portion and also functioning as an input device for said touch-sensitive display/input operating portion when removed from said antenna attachment portion.

2. A mobile communication information terminal apparatus according to claim 1, wherein said antenna attachment portion comprises an antenna connection portion with a female screw and the antenna connection portion contacts an antenna feeding portion.

3. A mobile communication information terminal apparatus according to claim 1, wherein said combination antenna/touch pen comprises an electrical conductor portion having a predetermined length, and a tip of said antenna combination/touch pen is tapered like a pencil, wherein said electrical conductor portion is electrically connected to said radio portion when said combination antenna/touch pen is attached to said antenna attachment portion, and an operation can be possible to said operating portion from outside.

4. A mobile communication information terminal apparatus according to claim 3, wherein said combination antenna/touch pen comprises a slim bar-shape electrical conductor portion along with the center axis of the said combination antenna/touch pen whose outer surface is surrounded by insulating material, and the bottom of the electrical conductor portion has a screw portion with larger diameter than said slim bar-shape electrical conductor portion, and a tip of the screw portion is tapered like a pencil.

5. A mobile communication information terminal apparatus according to claim 3, wherein the length of the electrical conductor portion is set to around a quarter of the wave length of said radio-wave signals.

6. A mobile communication information terminal apparatus according to claim 3 further comprising:

an impedance matching portion which is provided in said mainframe.

7. A mobile communication information terminal apparatus according to claim 6 further comprising:

a helical antenna which is provided in said antenna attachment portion and around said combination antenna/touch pen, and one end of said helical antenna electrically contacts the one end of the antenna attachment portion.

8. A mobile communication information terminal apparatus according to claim 6 further comprising:

a helical antenna which is provided in said antenna attachment portion and around said combination antenna/touch pen, and electrically connected to said radio portion; and a switching means for switching from said helical antenna to said combination antenna/touch pen when said combination antenna/touch pen is attached to said antenna attachment portion.

9. A mobile communication information terminal apparatus according to claim 8 further comprising:

a storage portion which is provided in said main frame for storing said communication information; and wherein, according to an operation of said switching means, said control portion reads out said communication information from said storage portion and carries out communication via said combination antenna/touch pen.

10. A mobile communication information terminal apparatus according to claim 8 further comprising:

a second switching means for detecting the insertion of the combination antenna/touch pen into the antenna connection portion; and a storage portion which is provided in said main frame for storing said communication information;

wherein, according to an operation of said second switching means, said control portion reads out said communication information from said storage portion and carries out communication via said combination antenna/touch pen.

11. A mobile communication information terminal apparatus according to claim 3 further comprising:

an attachment case which is provided in said mainframe for inserting said combination antenna/touch pen inside said mainframe.

12. A mobile communication information terminal apparatus according to claim 11 further comprising:

a helical antenna which is provided in said antenna attachment portion and around said combination antenna/touch pen, and one end of said helical antenna electrically contacts the one end of the antenna attachment portion.

13. A mobile communication information terminal apparatus according to claim 11 further comprising:

a helical antenna which is provided in said antenna attachment portion and around said combination antenna/touch pen, and electrically connected to said radio portion; and a switching means for switching from said helical antenna to said combination antenna/touch pen when said combination antenna/touch pen is attached to said antenna attachment portion.

14. A mobile communication information terminal apparatus according to claim 13 further comprising:

a storage portion which is provided in said main frame for storing said communication information; and wherein, according to an operation of said switching means, said control portion reads out said communication information from said storage portion and carries out communication via said combination antenna/touch pen.

15. A mobile communication information terminal apparatus according to claim 13 further comprising:

a second switching means for detecting the insertion of the combination antenna/touch pen into the antenna connection portion; and a storage portion which is provided in said main frame for storing said communication information;

wherein, according to an operation of said second switching means, said control portion reads out said communication information from said storage portion and carries out communication via said combination antenna/touch pen.

16. A mobile communication information terminal apparatus according to claim 3 further comprising:

a helical antenna which is provided in said antenna attachment portion and around said combination antenna/touch pen, and electrically connected to said radio portion.

* * * * *